No. 860,583. PATENTED JULY 16, 1907.
J. DE D. TEJADA.
SYSTEM FOR THE UTILIZATION OF HEAT AND POWER FROM HIGHLY EXPLOSIVE SUBSTANCES.
APPLICATION FILED AUG. 11, 1905.
7 SHEETS—SHEET 2.
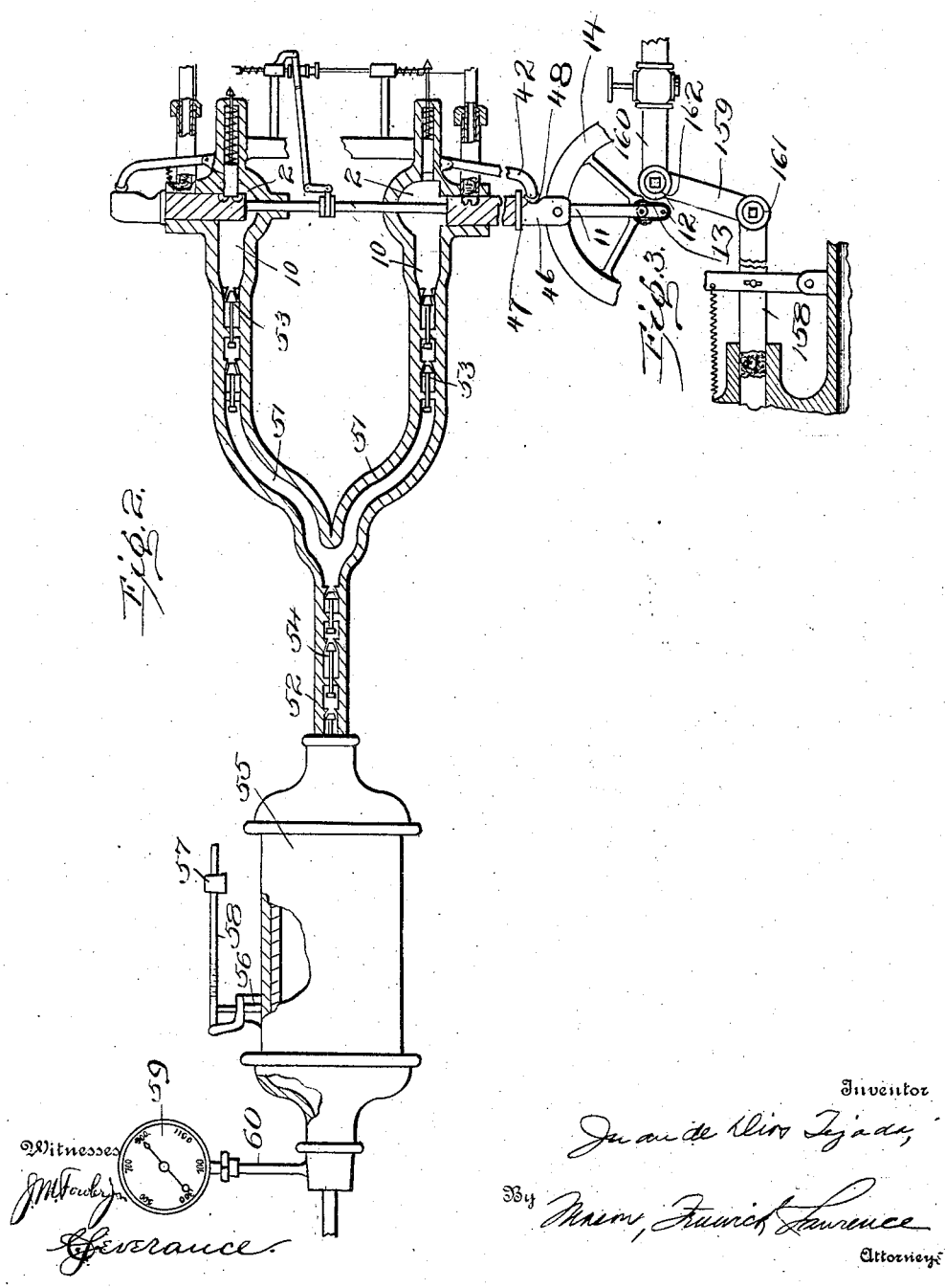

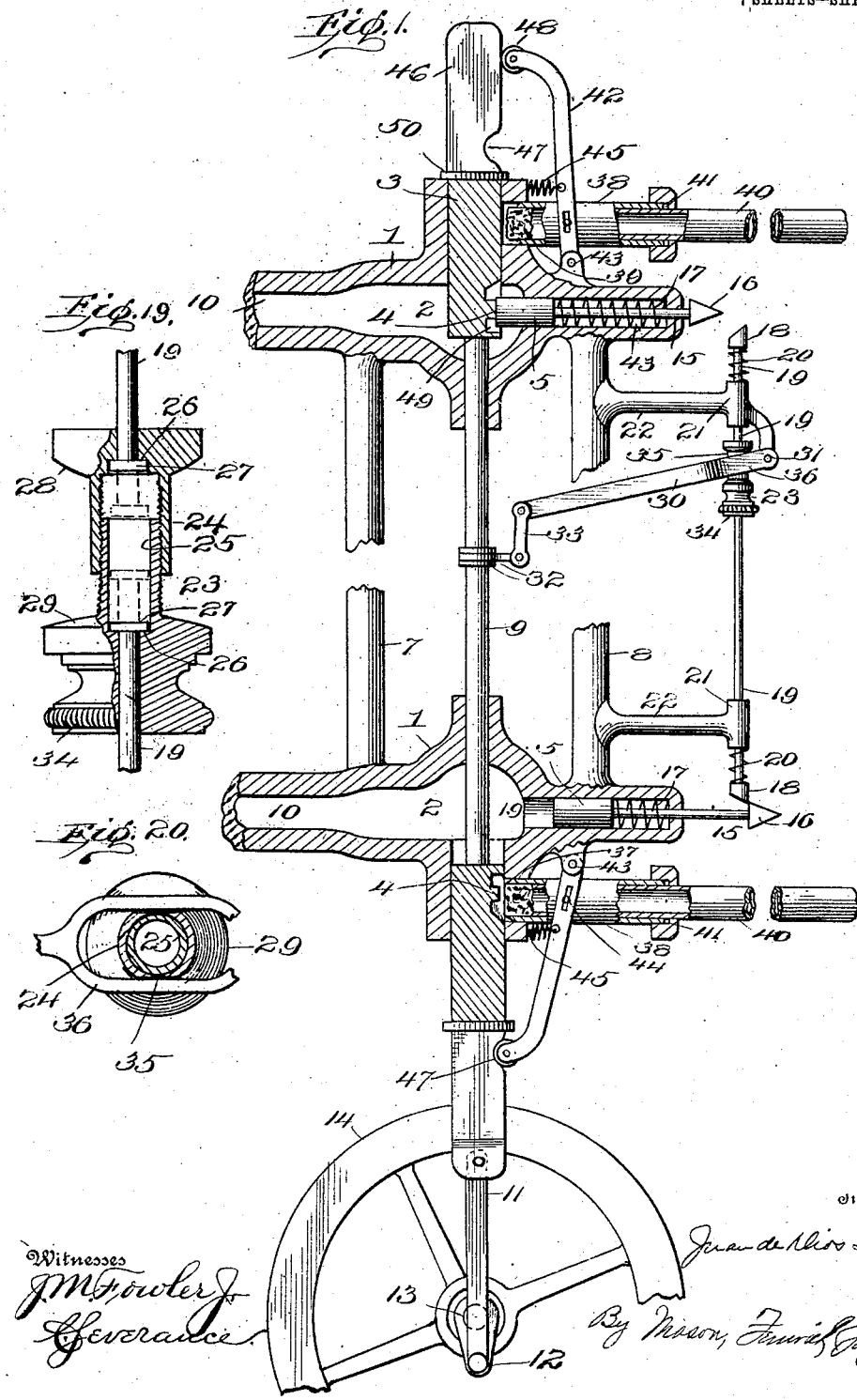

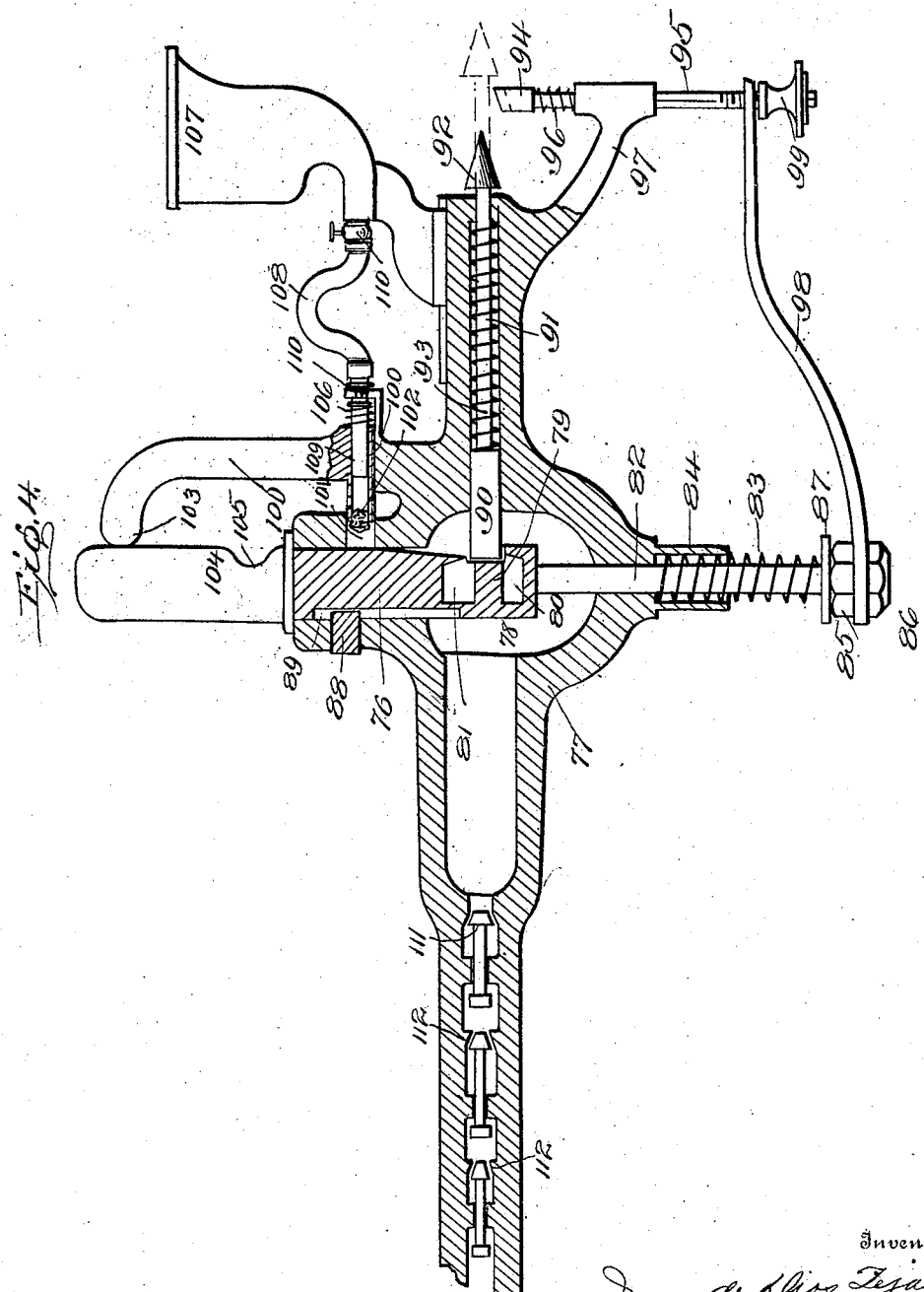

No. 860,583. PATENTED JULY 16, 1907.
J. DE D. TEJADA.
SYSTEM FOR THE UTILIZATION OF HEAT AND POWER FROM HIGHLY EXPLOSIVE SUBSTANCES.
APPLICATION FILED AUG. 11, 1905.
7 SHEETS—SHEET 4.
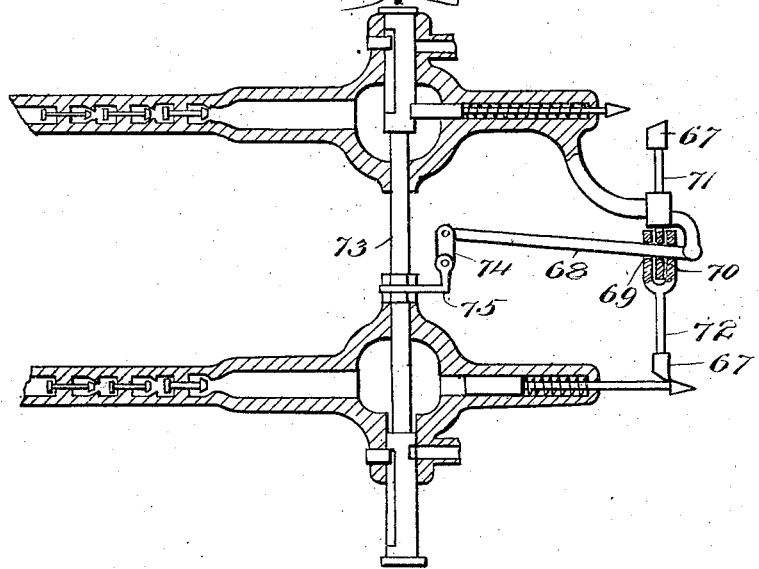
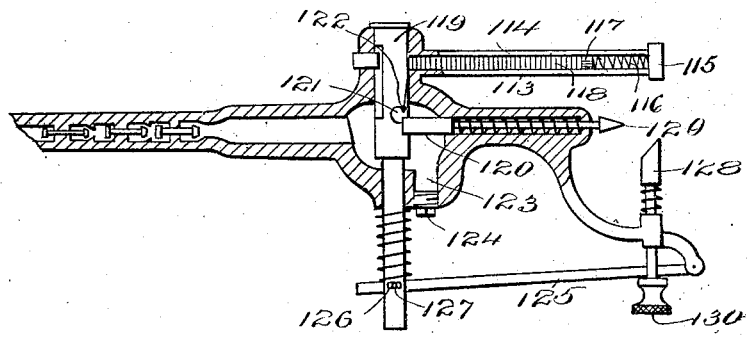

No. 860,583.  
PATENTED JULY 16, 1907.  
J. DE D. TEJADA.  
SYSTEM FOR THE UTILIZATION OF HEAT AND POWER FROM HIGHLY EXPLOSIVE SUBSTANCES.  
APPLICATION FILED AUG. 11, 1905.  
7 SHEETS—SHEET 5.
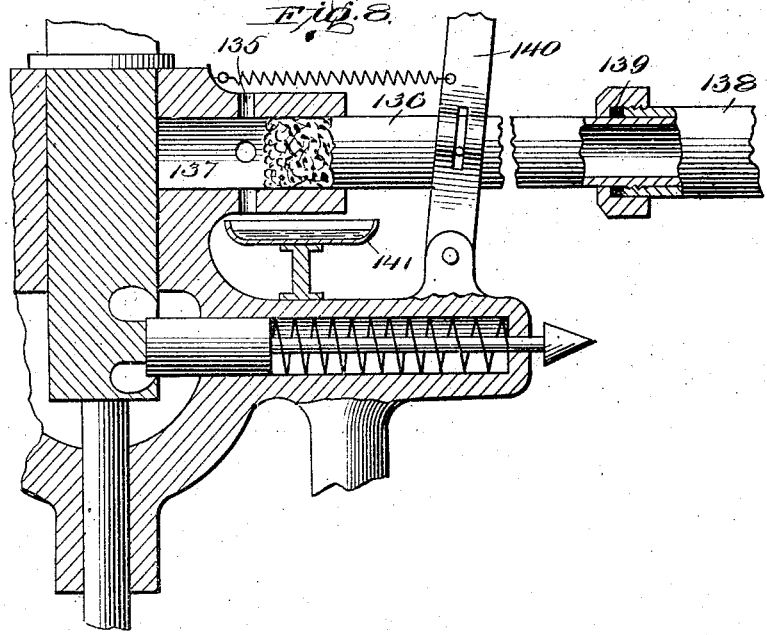
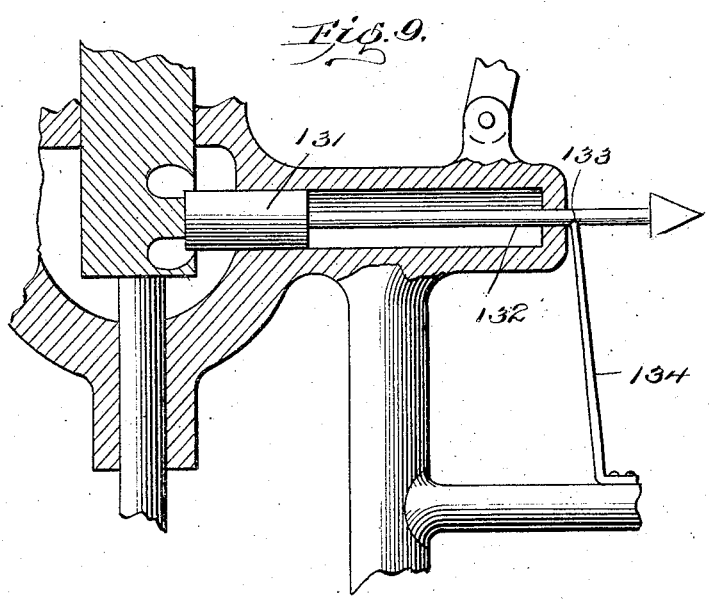

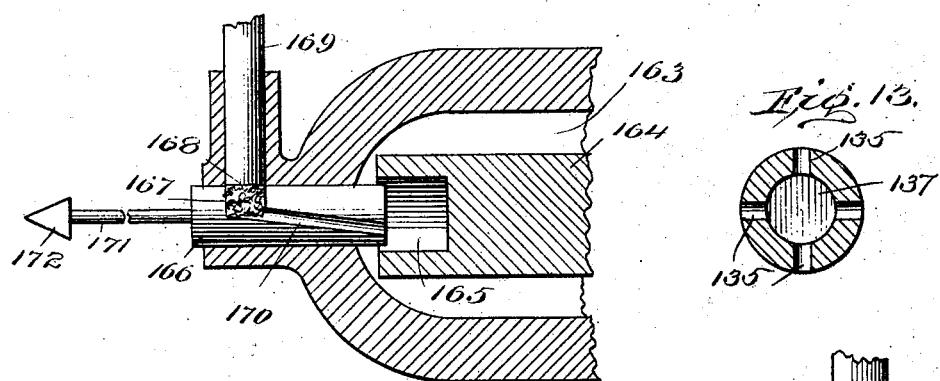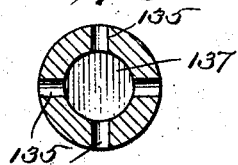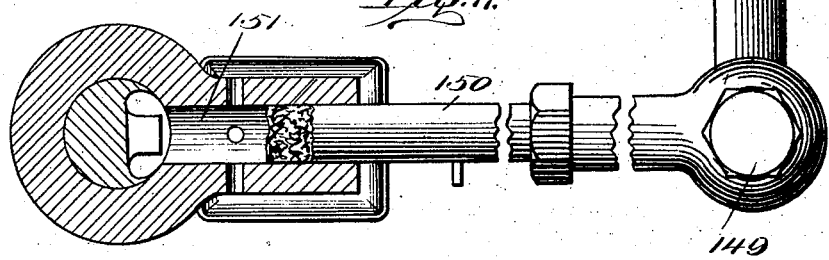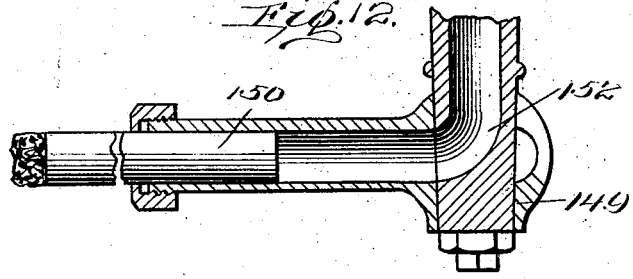

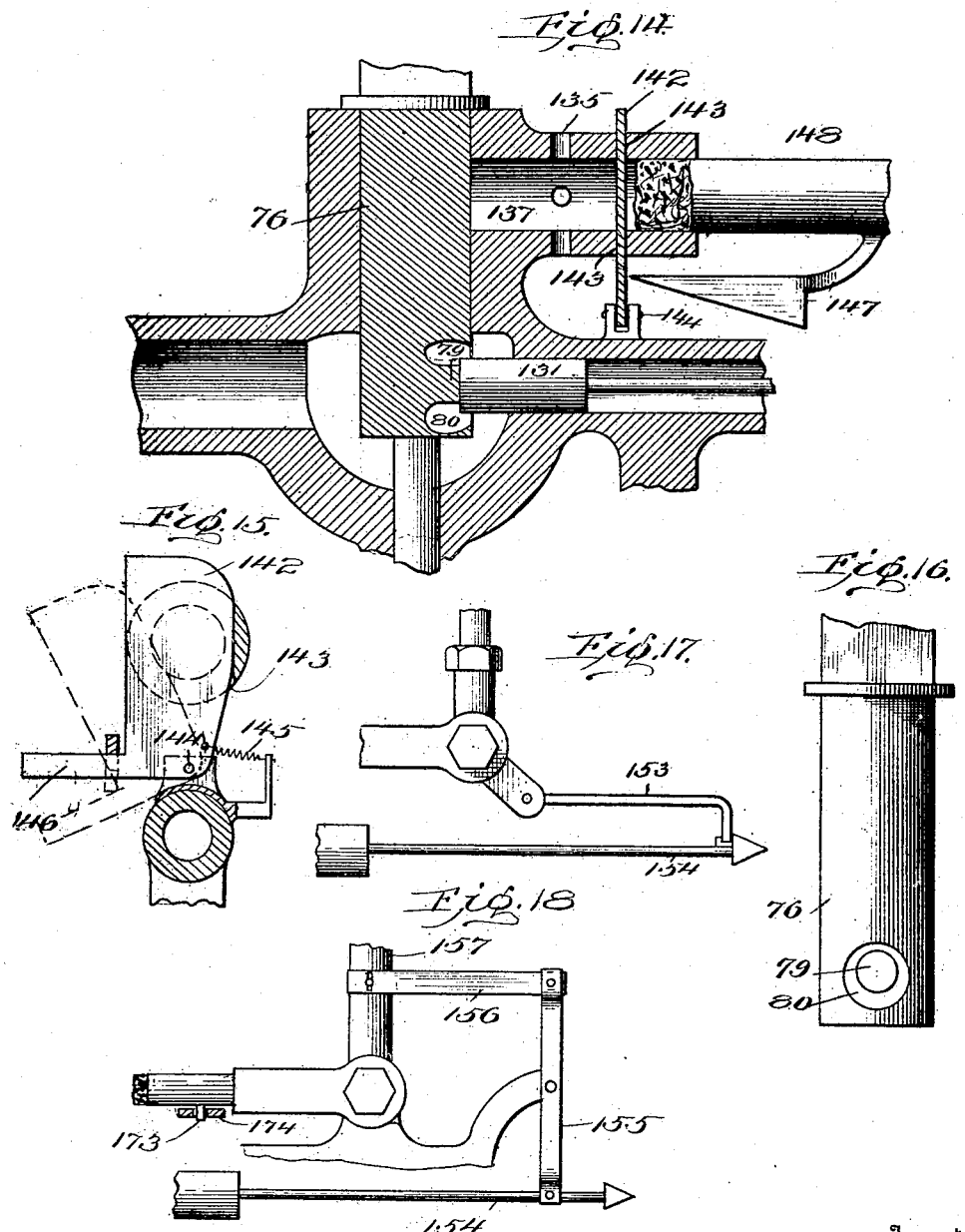

UNITED STATES PATENT OFFICE.

JUAN DE DIOS TEJADA, OF NEW YORK, N. Y.

SYSTEM FOR THE UTILIZATION OF HEAT AND POWER FROM HIGHLY-EXPLOSIVE SUBSTANCES.

No. 860,583.      Specification of Letters Patent.      Patented July 16, 1907.

Application filed August 11, 1905. Serial No. 273,800.

*To all whom it may concern:*

Be it known that I, JUAN DE DIOS TEJADA, a citizen of the United States, residing at New York, in the county of New York and State of New York, have invented certain new and useful Improvements in a System for the Utilization of Heat and Power from Highly-Explosive Substances; and I do hereby declare the following to be a full, clear, and exact description of the invention, such as will enable others skilled in the art to which it appertains to make and use the same.

This invention relates to improvements in a system for developing power and heat from highly explosive substances and has for its object the creating or generating at will, either in violent quick form or gradually, power caused by liberating the gases contained in a great variety of explosive substances and the storing of the force developed in the liberation of such gases for future use or applying such force directly to the production of movement as for instance in driving mechanisms of various kinds.

With these and other objects in view the invention comprises certain novel constructions, combinations and arrangements of parts as will be hereinafter fully described and claimed.

In the accompanying drawings, I have illustrated practical forms of mechanism for developing the power and heat which are to be obtained from high explosives in which Figure 1 is a central sectional view through a mechanism for developing pressure, motion and heat in exploding or detonating predetermined quantities of highly explosive materials. Fig. 2 is a view partially in section and partially in elevation showing a mechanism capable of developing and storing power or pressure evolved by the detonating of high explosives. Fig. 3 is a detail view showing the jointed feed mechanism with cut-off valves at the joint. Fig. 4 is a sectional view showing a single plunger mechanism for developing heat or power from the detonating of high explosives. Fig. 5 is a detail sectional view showing a modified form of the mechanism illustrated in Fig. 1. Fig. 6 is a similar view but showing a single plunger instead of a plurality of plungers, and apparatus whereby solid explosives may be used. Fig. 7 is a transverse section of the cartridge feeding tube. Fig. 8 is an enlarged detail sectional view through an explosive handling mechanism and showing a safety mechanism for preventing the back pressure of exploded gases upon the feeding device. Fig. 9 is a detail sectional view showing a detonating plunger operated by a flat spring instead of a coiled spring. Fig. 10 is a detail sectional view showing a detonating plunger capable of acting also as a feeder. Fig. 11 is a detail sectional view through a portion of the explosive feeding mechanism and illustrating a swinging arm for carrying the same. Fig. 12 is a detail sectional view through said swinging arm and through the valve or cut-off cock mounted in the joint thereof. Fig. 13 is a detail transverse sectional view through the explosive receiving inlet, the section being taken upon a plane passing through the safety escape passages. Fig. 14 is a detail sectional view showing the explosive feeding device provided with a safety cut-off mechanism. Fig. 15 is a detail sectional view of the same showing the cut-off slide in elevation. Fig. 16 is a detail view showing the detonating anvil arranged eccentrically in an aperture or recess formed in the main reciprocating plunger. Fig. 17 is a detail view showing the mechanism for moving the pivotally mounted feeder illustrated in Fig. 11. Fig. 18 is a detail view showing a modified structure for operating such a feeder. Fig. 19 is an enlarged detail sectional view of the coupling member for controlling a double latch mechanism. Fig. 20 is a transverse sectional view through the same, portions of the lever which engage the coupling being shown in elevation.

It has been heretofore considered impossible and dangerous to utilize the explosive power developed by the detonation of certain highly explosive materials, such for instance as nitro-glycerin, nitro-mannite, mannite and other substances, but after careful experiments and tests I have discovered that it is entirely practical and safe to employ such high explosives and have developed a system of utilizing the tremendous power which can be developed by detonating such substances, the system being set forth in the present application.

The object of the invention is the generation and accumulation of gases at very high pressures by the consecutive explosions of minute particles of explosive materials without risk or danger either to the operator or his surroundings or to the machine which is used in developing such power from the explosives.

In carrying out my invention I am able to develop safely and automatically the gases contained in any explosive substances whether such substances are in a liquid or solid form, amorphous, granulated or fibrous, and whether they are apt to explode either by concussion or direct violent blow or else by the indirect aid of a percussion cap capable of communicating an explosion to the mass.

In carrying out the invention I do not confine myself to the use of any particular explosive but indifferently employ such substances as nitro-glycerin and other liquid explosives as well as nitro-mannite, and solid dynamites with either inert or active bases and also a great variety of gun powders of different bases and various other explosive materials.

In handling such materials I employ a mechanism which is made up of a suitable casing and is provided with a reciprocating member having a detonating surface capable of being moved to a suitable point for receiving a charge of some explosive substance and thence being brought opposite a hammer or detonating plunger, the mechanism being capable of applying the force developed by the explosion of the material either directly to a mechanism or indirectly through the receiving and storing of the pressure generating gases liberated by the explosion of the materials employed.

I have illustrated in the accompanying drawings simple and preferable devices for properly handling the explosive materials above mentioned.

Referring now to the drawings, 1 indicates a casing having an explosion chamber 2 formed therein.

3 indicates a movable power imparting member or plunger which is provided with a detonating surface which I will term an anvil, as at 4.
Mounted in the walls of the casing 1 is a movable detonator or plunger 5 which is capable of being brought into contact with the anvil after it has received a charge of explosive material. To one side of the plunger or detonator 5 is an explosive feeding device which is capable of depositing a proper amount of the explosive material upon the anvil at the time when the anvil is brought opposite the said feeder.

In operating the mechanism it is necessary to provide a suitable means for drawing the plunger 3 inwardly after each explosion, the said explosions of course operating to push the plunger outwardly. I contemplate using different means for accomplishing the inward movement of the plunger or piston 3, and may use the said piston in a single machine, as shown in Fig. 4 or may connect the same with an opposing or balancing piston in a connected machine as shown in Fig. 1.

Since I usually construct the device with two opposing or balanced pistons as shown in Figs. 1, 2, and 5, I will first describe such a balanced mechanism. When using two oppositely arranged pistons as shown in Fig. 1, I employ two casings and two detonating plungers as well as two feeding devices, the parts thus named being identical at both ends of the machine.
The two casings 1 at each end of the machine are connected by any suitable braces or bars as 7 and 8 and the plungers 3 at the opposite ends of the machine are arranged in alinement with each other and are connected by a connecting or piston rod 9. The rod is made of such a length that when the piston 3 at one end of the machine is at the inner end of its stroke the piston at the other end of the machine is at the outer end of its stroke, as shown in Fig. 1. The parts are so related and spaced also that when the pistons are in this position the anvil 4 at one end is opposite the detonator 5, while the anvil at the other end is opposite the feeder, and in position to receive a charge of explosive material. As soon as the explosion occurs upon the anvil which is opposite the detonator the piston at that end of the machine is forced outwardly which draws the newly charged anvil opposite its detonator 5. The explosion thus caused again returns the parts to their original position and the successive explosions in the explosion chambers continue to rapidly change the position of parts in quick succession. The explosions cause a liberation of the gases in the explosion chambers which exert a strong pressure upon the surrounding parts always operating to force the pistons 3 outwardly and the detonators 5 outwardly and the pressure is also conducted through a suitable outlet 10 leading from each explosion chamber for immediate use at any desired point or into a storage tank as will be hereinafter fully described. The movement of the pistons 3 may also be utilized, the said pistons being connected with any suitable machinery. As shown in Fig. 1 the piston at either or both ends of the machine may be connected by means of a pitman 11, with a crank 12, for rotating a shaft and imparting a rapid movement to any kind of machinery. The shaft 13, thus rotated is generally operated with a fly wheel 14 for giving a proper momentum and even running motion to the parts.

The detonators are provided with mechanism for holding them in their outermost positions until the time when they are released for striking the anvil. As shown in Fig. 1 I provide each detonator with a stem 15, having an enlarged head 16 for engaging a catch. A spring 17 mounted within the casing 1 and abutting against the end of the detonator 5 normally forces the same toward the piston 3. The head 16 may be made of any desired shape but I find that it is preferable to form the same in the shape of a cone having its apex or point extending outwardly from the casing. Operating in conjunction with the conical head 16 of each detonator 5 is a latch 18, which is carried by a rod 19 moving at right angles to the stem 15. The end of the latch 18 is preferably beveled so that as the conical head 16 is carried outwardly by the detonator 5 the said head can slip by the said latch 18 and will be caught upon the sharp point thereof. A spring 20 normally tends to force the latch 18 toward the detonator and the said spring is seated against the guide bearing 21 of an arm 22 which projects from the framing of the machine and affords a support for the latch rod 19. The latch mechanisms at each end of the machine are precisely the same and so the numerals have been duplicated upon them.

The latch rods 19 are arranged in alinement with each other and their ends approach each other to within a short distance. An adjustable double sleeve 23 is used to connect the ends of these rods so that the latches may be permitted to separate a sufficient distance to engage both of the conical heads of the detonators when it is desired to stop the operation of the machine or they may be drawn inwardly toward each other a sufficient extent to permit only one of the said latches to engage its detonator at a time. The construction of the double sleeve or coupling 23 is clearly illustrated upon a large scale in Figs. 19 and 20. The said coupling is made up of two members 24 and 25 one member having a threaded portion telescoping into a threaded portion of the other member so that by turning one member with respect to the other they may be separated or brought together. The ends of the two members are provided with seats 26 for receiving heads 27 formed upon the inner face of the rods 19. Each of said coupling members is formed with an enlarged shoulder as at 28 and 29 and the said shoulders are so arranged as to be engaged by an arm or a lever 30. The lever 30 is fulcrumed at its outer end at 31 upon an arm projecting from the standard 22 and the other end of the lever 30 is connected in any suitable manner with the piston rod 9. I usually secure a collar 32 to the rod 9 and form the same with a projection which is pivotally connected with the adjacent end of the lever 30 by a link 33. By this construction when the rod 9 is reciprocated through the action of the pistons 3 the lever 30 will be vibrated or moved back and forth and by its engagement with the shoulders 28 and 29 will move the latches 18 successively into and out of engagement with the adjacent cones 16 of the detonators 5. It will be apparent that if the shoulders 28 and 29 are separated to a sufficient extent the lever 30 will not move them or the latches connected therewith to a sufficient extent to withdraw the latches from behind the cones or heads 16 and the detonators will thus be prevented from operating. By drawing the shoulders 28 and 29 closer together the latches will be moved a sufficient distance to withdraw them one at a time in succession from engagement with the conical heads 16 so as to permit the detonators to operate. The screw-threaded engagement of the coupling members 24 and 25 makes it possible to easily and quickly adjust them both for drawing them together or separating them and one of the said couplings as 25 is provided with an enlarged milled head 34, which can be grasped between the fingers and thus facilitate the turning of the member. The other coupling member 24 is preferably formed upon its outer surface with flattened sides 35 which are engaged by the slotted or bifurcated portion 36 of the lever 30. There is sufficient space within the slotted or bifurcated portion of the lever 30 for the sleeve 24 to move freely therein but there is not sufficient space to permit of the turning or twisting of the said coupling member, the flat faces 35 by their engagement with the lever preventing the same. It will thus be seen that in order to adjust the double sleeve or coupling it is only necessary to turn the milled head 34, in one direction or the other according as it is wished to separate the parts or draw them together.
Since the lever 30 is connected with the piston rod 9 and is thus directly operated by it, the latches will always preserve a given timed relation to the movement of the pistons and the detonators will be withheld from engaging the explosives upon the anvil, until said anvil is properly opposite the said detonator.

Of course I do not wish to be limited to the means described for separating the sleeves or coupling members since I may employ a different kind of coupling or may separate its component parts in a different manner without departing from the spirit of the invention.

The feeding devices are located opposite inlet passages 37 in the casings 1 which passages are located at a sufficient distance from the detonators 5 to be opposite the anvil 4 when the piston carrying the same is at the outer extremity of its stroke. The feeder may be adapted for feeding explosive materials either in a liquid form or in a solid or cartridge form as preferred. In Fig. 1 the feeders are shown as constructed for feeding liquid explosives such feeders being made up of a reciprocating member 38 which carries at its inner end a porous plug or liquid applying substance as indicated at 39. The said substance may be either felt, sponge or other like porous substance. When the anvil is opposite the feeder and the reciprocating member 38 is forced inwardly it will carry the sponge, felt or other substance against the anvil and will compress it sufficiently to squeeze therefrom a proper quantity of liquid explosives to constitute a charge. The movable member 38 slides upon the end of a feeding tube or pipe 40 which is connected with any suitable reservoir which contains the explosive material. A packing joint 41 is preferably carried by the reciprocating sponge carrying member 38 and engages the periphery of the pipe 40 so as to prevent any leakage of the explosive material between the movable parts of the feeder.

In order to accomplish the operation of the feeder in properly timed relation to the movement of the plunger or piston 3, the movable member 38 is preferably engaged by a lever 42 which is fulcrumed at 43, upon the casing and has a pin and slot engagement with the said member 38 as at 44. A spring 45 normally pulls the lever 42 toward the piston 3. To properly control the movement of the said lever 42 with respect to the position of the piston 3 I form the piston 3 with an extension 46 and said extension is provided with a notch 47 into which the end of the lever 42 may drop when the piston 3 is in its outermost position. An anti-friction roller 48 is provided at the end of the lever 42 so that the said lever may not materially retard the movement of the piston 3. When the piston 3 is in its outermost position and the lever 42 drops into the recess 47, the feeder member 38 is forced inwardly through the action of the spring 45 and the liquid explosive material is placed upon the anvil. When the piston 3 is drawn inwardly the lever 42 will be lifted out of the recess 47 and the plunger and movable member 38 will be carried outwardly so as to not engage the piston. The complete retraction of the plunger from its engagement with the piston will prevent any danger of the explosive material being exploded or detonated at the point of entrance into the machine. The anvil with its charge is carried well within the casing 1 and is separated from the inlet and the feeder by a considerable thickness of wall.

The anvil 4 is mounted in a recess 49 formed in the piston 3, the lower portion of said recess operating to receive the bulk of the charge of the explosive material which has been squeezed from the sponge. The sponge of course operates to thoroughly wipe the surface of the anvil with the said explosive material and a sufficient quantity of the same is thus placed upon the detonating surface of the anvil to cause the explosion when the detonator 5 is forced against the anvil. It is quite essential that the surface of the anvil shall be smooth and that its plane shall be perfectly parallel with the plane of the end of the detonator. Thus a perfect contact between the parts is secured without which a small portion of explosive material will not always be exploded. The inward movement of each piston 3 is limited by a shoulder or annular rib 50 formed upon the outer end of said piston and capable of engaging the walls of the casing 1 at the precise moment when the anvil is directly opposite the detonator. Where the pistons are connected by the rod 9 the shoulder 50 of each piston of course limits the outward movement of the opposite piston.

In Fig. 2 the mechanism as shown in Fig. 1 is illustrated in such a form that a practical means of receiving and storing the charges of explosive gases liberated by the explosions in the chambers 2 may be shown. As illustrated in this view the outlets 10 leading from the chambers 2 communicate with pipes 51 which converge and connect with a tank inlet pipe 52. The passage through the pipes 51 is guarded by reciprocating valves 53 of any desired type the valves being so formed that the expanded gases may escape from the explosion chamber past them but cannot return. The pipe 52 is likewise provided with valves 54 for permitting the gases to pass into a storage tank 55. The storage tank or chamber 55 may be of any desired size and is preferably constructed with very strong reinforced walls capable of withstanding a heavy pressure. A safety valve 56 is usually provided for the tank 55 and its blow-off or safety joint may be controlled by a weight 57 mounted upon a lever 58, which lever engages the valve. When the pressure in the tank exceeds the safety point, the weight 57 will be lifted and the gas will be permitted to pass the valve and escape in the atmosphere. I usually also provide the storage tank or vessel 55 with a gage 59 communicating with the interior of the casing by means of a pipe 60. The gage will be capable of indicating at all times the pressure within the tank.

It is a very important matter in connection with the invention to be able to develop the pressures produced by the liberation of the gases in the explosion chambers, for then they may be used for a great number of purposes and can be drawn from the tank as required. The application of the system for the purpose of driving machinery directly from the plungers is also an important matter and it will be seen that the plunger mechanism may be duplicated to any desired extent for developing required power in driving various kinds of machinery.

As shown in Fig. 5 the exploding devices may be connected with pressure storing means and the pistons feed not be connected with any movable mechanism. In this view latches 67 are used which are positively moved in opposite directions by a lever 68, the said lever engaging slots 69 and 70 formed in the adjacent ends of the latch rods 71 and 72. The lever 68 is connected with the piston rod 73 by a link 74 and an arm 75 which is rigidly secured to said piston rod 73.

As shown in Fig. 4 it is not needful that a plurality of plungers be employed in carrying the system into practical effect. As shown in this figure an entirely successful manipulation of the principal features of an exploding mechanism is illustrated, in which a single plunger 76 is mounted in a casing 77 which casing contains an explosion chamber 78. The plunger or piston 76 is formed with the usual anvil 79 and a liquid explosive receiving recess or chamber 80 is provided below the said anvil. Above the anvil an aperture is formed as at 81 to accommodate to some extent the initial explosion of the explosive material. Of course the space around the anvil is left open to permit the liberated gases to extend into all portions of the explosion chamber 78. The piston 76 is provided with a piston rod 82 which extends beyond the casing 77 and is surrounded at its outer end by a spring 83. This spring is seated in a socket or recess 84 formed in the casing around the said piston rod 82. Adjusting nuts 85 and 86 are carried upon the outer end of the piston rod 82 and the nut 85 is so set as to maintain a proper tension upon the spring 83 for drawing the piston 76 into the explosion chamber after it has received a new charge from the feeder. A washer 87 is usually interposed between the spring 83 and the nut 85. It will be understood of course that the explosion within the chamber 78 forces the piston 76 outwardly compressing the spring 83. After the piston ceases to feel the effect of the explosion the said spring 83 expands and draws the piston back into the explosion chamber.

It is necessary to limit the outward movement of the piston 76 and for this purpose I employ a key or stop lug 88, mounting the same in the walls of the casing and permitting its inner end to extend into a keyway 89 formed in one side of the piston. The inner end of the key 88 is preferably made to fit quite closely the key-way 89 so as to not only be capable of limiting the outward movement of the piston but to prevent the turning of the said piston in the casing. This is quite essential since any turning of the anvil to one side with respect to the detonator employed would prevent the proper explosion of the explosive materials upon said anvil.

In connection with the piston just described I employ the usual detonator 90 having a stem 91 and a cone shaped head 92, the said detonator being normally forced inwardly by a spring 93. A latch 94 is used which is carried by a rod 95 and the said latch is normally forced toward the cone shaped head 92 by a spring 96. The latch rod 95 is guided in position by a bearing formed upon the outer end of an arm 97. In order to move the latch in proper relation to the movement of the piston I secure an arm 98 to the end of the piston rod 82 securing the said arm thereon by means of the nut 86. The outer end of the arm 98 is provided with an aperture to receive the rod 95 and a set screw or thumb nut 99 is applied to the screw-threaded end of the said rod 95 for drawing the said rod outwardly against the action of the spring 96. Of course it will be understood that when the piston 76 is in its innermost position the latch 94 should be retracted sufficiently to release the detonator 90 and permit it to produce an explosion upon the anvil. The thumb nut 99 is therefore so adjusted as to cause the arm 98 to withdraw the latch 94 just as the piston reaches the inner extremity of its stroke. Of course as soon as the explosion takes place and the piston is driven outwardly again the arm 98 is moved with it so that the spring 96 may cause the latch 94 to engage and hold the conical head 92 as the detonator is forced outwardly by the action of the explosion. The action of the mechanism is thus rendered entirely automatic. In order to stop the operation of the device, however, it is only necessary to unscrew the thumb nut 99 sufficiently to prevent the latch 94 from being withdrawn from the conical head 92 when the piston reaches its innermost position. The detonator will thus be prevented from causing an explosion upon the anvil and the device will cease operating until the detonator is again released.

The feeding device for delivering the explosives to the mechanism may be somewhat altered also and as shown in Fig. 4 it is made up of a movable section or member 100, mounted in a recess or bearing 101 formed in the casing, the said movable member carrying a sponge or other absorbent plug 102 and having a prosection 103 which engages a projection 104 on the end of the piston 76. This projection is formed with a depression 105 similar to the depression 47 already described, and permits the feeder to be pressed inwardly by the action of a spring 106 when the anvil 79 is opposite said feeder. A suitable reservoir 107 is mounted upon the casing and is connected by means of a yielding or flexible piping 108 with a member or pipe 109 which projects into the movable member 100. The flow of materials through the piping is controlled by a suitable valve or cock 110. The yielding pipe section 108 prevents the possibility of any jar being communicated to the explosive material in the reservoir 107. The casing is provided, as in the other instances heretofore described, with an outlet passageway having a series of controlling valves 111 which engage a series of valve seats 112. These valves permit the gases to pass out from the explosion chamber but prevent their return thereto.

In Fig. 6 I have illustrated a mechanism adapted for using explosives in solid form. In this figure the casing is provided with an elongated tubular feeder 113. This tubular feeder is preferably slotted along one side as at 114 so as to permit of an expansion of the contents thereof and the outer end of the feeder is closed by means of a cap 115 which comprises a spring 116, forcing it against a plunger 117 which is movably mounted in the feeder. Suitable cartridges 118 containing explosive materials are placed in the feeder and are fed toward the piston 119 which moves within the casing of the machine. The anvil opening is made of sufficient depth to receive the cartridges one at a time from the feeder and carry them successively opposite the detonator 120. It is not necessary when using these cartridges to employ a recess below the anvil to receive explosive materials as in the case of the employment of liquid explosives. I usually, however, employ a recess above the anvil as 121 to accommodate some of the initial explosion and an inclined surface as 122 extends therefrom outwardly toward the outer end of the piston, the said incline serving to force the cartridges back into the feeder when the explosion is about to take place. In this form of mechanism the explosion chamber is provided with an outlet opening 123 which is normally closed by a plug 124. The materials which go to form the cartridge namely, the shells whether of paper or other material collect in the bottom of the explosion chamber and can be removed from time to time by taking out the plug 124. As shown in this view also the latch for the detonator may be operated by a lever 125 which is provided with a slot 126 for engaging a pin 127 carried by the piston rod of the piston. This simple connection between the piston rod and the lever makes it possible to operate the same for retracting the latch 128 from its engagement with the cone head 129 of the detonator. A thumb nut 130 is also employed for adjusting the latch with respect to the lever 125 and for starting or stopping the machine.

As shown in Fig. 9 the detonator, as 131, may be provided with a stem 132 which has a recess 133 outside the guide casing in which the detonator moves which recess is engaged by a flat spring 134 secured to the framing of the machine. The said flat spring is so mounted that it tends to force the detonator inwardly for causing an explosion and the outward movement of the said detonator is of course against the action of the said spring. The detonator is held in its outer position by a latch mechanism such as has already been described.

In order to insure absolute safety against the explosion of liquid materials at the feeder I sometimes construct the casing as at Fig. 8 with escape apertures 135 arranged opposite the point where the sponge or other porous explosive carrying medium moves. When the casing is thus constructed the movable sponge carrier 136 is so mounted that it may be retracted beyond the apertures 135 and in the event of any liberated gases from the explosion chamber finding their way around the piston and into the inlet opening 137 they will find immediate escape through the apertures 135 and can exert no pressure against the end of the sponge on the sponge carrier. As shown in Fig. 8 the sponge carrier may be made to telescope into the end of an explosive supply tube as at 138, a suitable packing as 139 being provided to prevent leakage. A spring actuated lever 140 similar to the lever 42 already described is used for moving the sponge carrier in and out in accordance with the operation of the main piston of the machine. As there is sometimes a slight dripping or leakage from the portion of the machine adjacent to the sponge I contemplate employing a drip cup or pan 141 mounted upon the casing of the machine and extending below the exhaust apertures 135 and below the end of the sponge carrier 136. Any slight dripping of the explosive materials will thus be caught and retained by the said drip cup or pan.

To still further guard against any jarring of the feed tube or reservoir used in supplying explosive materials to the mechanism a cut-off or safety slide 142 may be used as clearly shown in Figs. 14 and 15. Such a slide is pivotally mounted in a slot 143 formed in the casing to one side of the exhaust apertures 135. The said slide is pivoted at 144 and is normally held so as to extend across the inlet passage by a spring 145. An arm 146 projects from the said safety slide and preferably extends outside the casing and lies across the path of a beveled detent or arm 147 which is carried by the sponge carrier 148. When the sponge carrier 148 is moved inwardly toward the piston or plunger of the machine to deliver a charge of explosive materials, the said beveled arm 147 will engage the arm 146 of the safety slide and tip the slide upon its pivot point to one side of the inlet aperture or passage against the action of the spring 145. The sponge carrier may thus be permitted to move inwardly until it engages the anvil. Upon the retraction of the sponge carrier the spring 145 will immediately bring the slide 142 between the sponge carrier and the piston or plunger of the machine and prevent any pressure which might possibly reach the inlet passage from engaging the sponge or its carrier. Such pressure must thus of necessity escape from the exhaust passages 135. While I do not find such a device necessary in a perfectly made machine yet it affords an additional security in handling highly explosive materials and makes it absolutely certain that the jar or back pressure of gases from the explosion chamber shall not reach the feeding tube or reservoir.

I also contemplate employing other safety means in connection with the explosive feeder. For instance in Figs. 11 and 12 I have shown an explosive feeder which is provided with a joint as at 149, the said joint making it possible to swing the sponge carrier 150 to one side after it has been withdrawn from the inlet passage 151. The joint 149 may be made in the form of a plug and socket as shown in Fig. 12, the plug 152 operating as a stop cock when the sponge carrier is swung to one side. The flow of liquids through the inlet tubing is thus cut-off when the sponge carrier is moved to one side. The movement of the sponge carrier to one side is accomplished in various ways and preferably in connection with the movement of the detonator. This is shown in Fig. 17 wherein the pivoted sponge carrier is connected by a link 153 with the stem 154 of the detonator so that when the detonator is in its innermost position the feeder will be moved to one side. When, however, the detonator is in its outer position so that the piston carrying the anvil may be brought opposite the inlet passage, the safety carrier will be swung into position to be forced into said passage. As shown in Fig. 18 this mechanism may be further modified by employing a pivoted lever 155 which is pivoted at one end to the stem of the detonator and at the other end to a link 156 which is pivotally connected with an arm 157 of the swinging sponge carrier. The operation of this mechanism is practically the same as that just described with respect to the structure shown in Fig. 17.

In Fig. 3 I have shown a still different manner of making the feed tubing in which, however, the sponge carrier 158 is connected by means of a link 159 with the reservoir tube 160. The said link 159 carries a cut-off plug at each end as 161 and 162. The cut-off plugs are so located with respect to the bore of the tubing that when the sponge carrier is retracted to its withdrawn position the cut-off plugs will stop the flow of liquid from the tubing. When the feeder is moved inwardly again the flow of liquid will be directed through the tubing for supplying the sponge or other porous substance with the necessary explosive liquids.

It will thus be apparent that the feeding mechanism employed can be constructed in several ways all of which are advantageous for applying explosive liquids to the anvil of the machine.

As still further showing the manner in which the parts may be arranged with respect to each other for receiving and acting upon liquid or other explosives I have illustrated in Fig. 10 a portion of a machine formed with an explosion chamber as 163, in which is longitudinally arranged a reciprocating plunger 164 having an anvil recess 165 in one end. Mounted in the casing and immediately opposite the end of the said plunger 164 is a detonator 166. The detonator is arranged to move in alinement with the plunger 164 and the said detonator is formed with an inlet passage 167 for receiving the liquid explosives from the sponge 168 which is forced into said inlet by means of a sponge carrier 169. A passage 170 is formed in the detonator and extends from the inlet recess 167 to the inner end of the detonator so as to be capable of dropping the liquids which run through the said passage into the anvil recess 165. The passage 170 is preferably inclined sufficiently to facilitate the running of the liquids through the same and into the anvil recess. The detonator may be provided with the usual stem 171 and a conical head 172 which is capable of engagement by a latch such as has already been described. It will be observed that when the detonator is retracted by action of the explosion in the chamber 163 its inlet recess 167 will be brought opposite the feeder to receive a new charge. Upon forcing the detonator into the casing again the liquid explosive which has already run down the passage 170 and dropped into the anvil recess 165 will be detonated or exploded in such recess for forcing the plunger 164 outwardly and also for forcing the detonator outwardly to receive another charge. In this simple manner the detonator may be made to assist in the feeding of the explosives to an explosion chamber for causing the explosion of highly explosive materials and the performing of certain work both in the explosion chamber and elsewhere, as heretofore fully described.

It will thus be seen that the device used for carrying out the principles of the invention may be of an extremely simple character and one in which the parts that are effective for the purposes desired can not readily become disarranged or get out of order.

When employing the forms of feeders in which the explosive applying sections are made to swing to one side it will be observed that the sponge carrying section is provided with a pin 173, the said pin extending from one side of the feeder section only. This pin engages the slot in the feeder operating lever as 174, shown in Fig. 18. The parts are so related in this structure that when the detonating plunger is forced into the explosion chamber the feeder arm which has then been retracted by the lever 174 will be carried away from said lever, the pin 173 merely passing out of the slot. When the detonator is forced outwardly again by the explosion the feeder, as shown in Fig. 18, will be swung into position opposite the inlet opening of the casing and the pin 173 will enter the slot in the lever 174 and thus when the said lever is permitted to move toward the anvil piston it will carry the sponge carrying section of the feeder into the casing again.

It will be obvious that various minor changes in the details of construction both of the feeder and of the other parts of the mechanism may be made without departing in the least from the spirit of the invention.

Having thus fully described my invention, what I claim as new and desire to secure by Letters Patent, is:

1. A pressure generating and accumulating device having a movable piston carrying an anvil, means for depositing charges of high explosives upon the anvil, and a detonator adapted to strike the explosives upon said anvil.

2. A pressure generating and accumulating device, having an explosion chamber, a movable piston having an anvil formed thereon, an explosive feeder, a detonator, and means for moving the piston so as to bring the anvil alternately opposite the said feeder and the detonator for exploding charges of high explosives in said chamber.

3. A pressure generating and accumulating mechanism, having an explosion chamber, a reciprocating piston having an anvil thereon, a feeder and a detonator mounted opposite the said piston and means for reciprocating the said piston to move the anvil opposite said feeder and detonator for exploding charges of highly explosive material in rapid succession.

4. A pressure generating and accumulating mechanism, comprising a casing forming an explosion chamber, a reciprocating piston mounted therein, an explosive feeder mounted opposite the piston, a detonator also mounted opposite the piston, and means for returning the piston and the detonator to explosion producing proximity within the explosion chamber.

5. A pressure generating and accumulating mechanism, comprising a casing forming an explosion chamber, an explosive feeder, and a detonator mounted in the walls of the said chamber, an anvil and a member carrying the same, and means for moving the anvil first opposite the feeder for receiving a charge of explosive material and then opposite the detonator for producing an explosion.

6. A pressure generating and accumulating mechanism, comprising a casing forming an explosion chamber, a reciprocating member carrying an anvil, a reciprocating explosive feeder, a reciprocating detonator, means for bringing the anvil surface successively opposite the feeder and detonator and means for reciprocating the feeder and the detonator successively as the anvil surface is presented successively to them.

7. A pressure generating and accumulating mechanism, comprising a casing provided with an explosion chamber, a storage receptacle capable of receiving the gases generated in the said explosion chamber, a duct connecting the explosion chamber and receptacle a reciprocating piston operating in the explosion chamber, an explosive feeder and a detonator operating in conjunction with the piston for producing a succession of explosions within the explosion chamber, and means connected with the piston for receiving the movement imparted thereto and communicating it to mechanism to be operated.

8. A pressure generating mechanism, comprising a casing formed with an explosion chamber therein, an explosive carrying piston moving in the casing, a detonator also moving in the casing, means whereby the explosion within the explosion chamber operates to force the said piston and detonator outwardly, and means engaging the detonator for producing a return movement as soon as the effect of the explosion has subsided.

9. A pressure generating mechanism, comprising a casing formed with an explosion chamber therein, a reciprocating explosive carrying piston having a recess for receiving the explosive material, and an exploding surface, a reciprocating detonator operating at right angles to the explosive carrying piston and capable of impinging upon the exploding surface of said piston, and feeding means capable of placing a small portion of explosive material upon the exploding surface when the piston is at the limit of its outward movement, and means for normally forcing the piston and the detonator into the explosion chamber, the explosions therein forcing them outwardly again.

10. A pressure generating and applying mechanism comprising a casing forming an explosion chamber, a reciprocating explosive carrying piston, a yielding feeding device for feeding explosive charges to the said piston and a reciprocating detonator for exploding the charges within the explosion chamber.

11. An explosion generating and applying mechanism comprising a casing having a plurality of explosion chambers, synchronously moving pistons operating in the explosion chambers, a piston rod connecting them, a feeder for delivering explosives to each piston, detonators arranged to strike the pistons latches for controlling the operation of the detonators, rods connecting the latches, a lever for operating the rods and connected with the piston rod of the pistons, and an adjustable controlling member carried by the said latch rods, and capable of affecting the latches for starting or stopping the mechanism.

12. A pressure generating and applying mechanism, comprising a casing, explosion chambers formed therein, a piston rod carrying oppositely arranged pistons, one moving in each explosion chamber, feeding mechanism adjacent to each piston for delivering explosive materials thereto, a detonator for each piston, latches for controlling the detonators, rods connected with said latches, a lever connecting the rods with the piston rod of the machine and a telescoping sleeve member interposed between the said lever and the latch rods for causing the latches to engage one or both of the detonators.

13. A pressure and power generating mechanism, comprising connected reciprocating pistons, a casing forming an explosion chamber around the end of each piston, detonators extending into the explosion chambers, explosive feeders for each piston, levers for operating the feeders in conjunction with the movement of the pistons and extensions upon the ends of the pistons having recesses for controlling the position of the levers in accordance with the position of the pistons.

14. A pressure and power generating mechanism, comprising a casing, inclosing an explosion chamber, a reciprocating explosive carrying piston mounted in said casing and having a projection outside the casing formed with a recess in its edge, a feeding device capable of movement toward and away from the said movable member and a projection extending therefrom and engaging the recessed projection on the said movable member, the said recessed projection controlling the admission of the explosive and a detonator arranged to explode charges upon the piston.

15. A pressure and power generating mechanism, comprising a casing having an explosion chamber therein, a reciprocating explosive carrying member moving in said casing for feeding explosive material to the said casing, comprising a feed pipe, a reciprocating feeder, means for normally forcing the feeder inwardly, means carried by the said feeder for forcing it outwardly again, a flexible connection interposed between the said feed pipe and the movable feeder and a detonator arranged to explode charges upon the piston.

16. A mechanism for exploding high explosives, comprising a casing, a movable explosive carrying piston mounted therein, a feeding device for delivering explosives to the piston, comprising a feed pipe, a jointed delivery pipe operating near the end of the said feed pipe, means controlled by the movement of the piston for regulating the position of said jointed pipe, and a detonator arranged to strike the piston and explode charges thereon.

17. A mechanism for deriving power from high explosives, comprising a casing, a piston moving therein, an explosive supply pipe, an explosive delivery pipe arranged to reciprocate upon the said supply pipe and extending into the said casing, and a lever pivotally engaging the delivery pipe and also engaging an extension of the piston, and means for holding the lever against said extension, the movement of the piston thus controlling the introduction of the explosive material and a detonator arranged to strike the piston and explode the charges thereon.

18. A mechanism for developing power from high explosives, comprising a casing, a movable piston mounted therein, a pipe for delivering explosives to the piston, a plug of porous material carried by the said delivery pipe and means for pressing the said porous material against the piston for depositing a sufficient amount of the explosive material to form a charge and means to explode the charge upon the piston.

19. A mechanism for developing power from high explosives, comprising a reciprocating explosive carrying piston, a casing inclosing the same, a feeder for delivering the explosive material to said reciprocating piston comprising supply tubing, a movable section mounted thereon and having a porous plug in its delivery end, a lever connected with the movable section, a spring for normally forcing the lever toward the piston, and means projecting from the piston and engaging said lever for permitting the pressing of the plug against the piston to squeeze out a proper charge of explosive material within the machine and means to explode the charge upon the piston.

20. A machine for developing power from high explosives, comprising a casing forming an explosion chamber, a movable piston mounted therein and provided with an anvil or exploding surface, a feeder a projecting feeder operator carried by the piston having a recess formed in its edge, a feed mechanism opposite an inlet aperture in the said casing, a movable section capable of entering said aperture and having a spongy porous material in its end, a lever connected with the movable section an anti-friction roller carried by the lever and engaging the feeder operator upon the piston, and means for normally pressing the said lever against said controlling projection and means to explode the charge upon the piston.

21. A mechanism for developing power and pressure from high explosives, comprising a casing, a reciprocating piston, the said casing having an inlet opening opposite said reciprocating piston, a feeder mounted opposite said opening and capable of being forced therein, the casing being extended to the said inlet opening and provided with lateral escape passages, means to explode a charge upon the piston and means for retracting the feeder beyond said escape passages when an explosion is about to take place in the casing.

22. A mechanism for developing power and pressure from high explosives, comprising a casing, a reciprocating piston mounted therein and carrying an anvil and provided with a longitudinal groove, a key mounted in the casing and engaging the groove formed in the piston, the said key limiting the extent of movement of the piston and preventing its twisting or turning, a feed mechanism for delivering explosives to the said anvil and a detonator engaging the anvil and exploding the said materials.

23. A mechanism for developing power and pressure from high explosives, comprising a casing, a reciprocating piston mounted therein, the casing having an inlet opposite the piston and provided with escape passages, a feeder capable of being forced into said inlet passage for delivering the explosives, a detonator means for operating the feeder and detonator for exploding the materials upon the anvil member and a drip cup mounted beneath the escape passages for collecting any dripping of the explosives.

24. A mechanism for developing pressure and power from high explosives, comprising a casing, a reciprocating piston, a detonator operating in conjunction therewith, the casing being formed with an inlet passage opposite the piston, a feeder capable of entering the inlet passage, means for operating the same in conjunction with the movement of the piston and a safety slide capable of movement into position between the feeder and the piston at the time of an explosion within the mechanism.

25. A mechanism for developing power and pressure from high explosives, comprising a casing, a reciprocating piston and a detonator operating in conjunction therewith, the said casing having an inlet passage leading to the piston, an elongated tubular extension formed on the casing around the inlet passage and having exhaust outlets formed therein, the said tubular extension also having a lateral opening, a safety slide pivoted to oscillate in said lateral opening, a feeder capable of insertion in the inlet passage, means carried by the feeder and capable of engaging the said safety slide for moving it to one side as the feeder enters the casing, and means for operating the feeder in conjunction with the movement of the piston.

26. A mechanism for developing force and power from high explosives, comprising a casing having an explosion chamber therein, a reciprocating piston mounted in the casing, a detonator operating in connection therewith, the casing having an inlet passage opposite the said piston, a tubular extension formed about the said inlet passage and arranged to receive a feeder, such tubular extension having a laterally arranged slot in its walls, a pivoted slide mounted for movement in said slot, an arm carried thereby, a feeder capable of entering the inlet passage, an arm projecting therefrom and having an inclined or cam surface for engaging the arm of the safety slide and moving it to one side as the feeder enters the casing, and means for forcing the feeder into the inlet passage at each reciprocation of the piston.

27. A mechanism for developing power and pressure from high explosives, comprising a casing having an explosion chamber therein, a reciprocating member mounted therein and formed with an explosive receiving recess, a projection eccentrically mounted in said recess and forming an anvil, means for feeding explosives to said recess and the anvil, and a detonator for exploding the materials upon the said anvil.

28. A mechanism for developing power and pressure from high explosives, comprising a casing having explosion chambers therein, connected pistons moving in said explosion chambers, means for feeding explosive charges to said pistons, detonators operating in conjunction with the pistons, latches for holding the detonators temporarily in their outermost positions, rods carrying the latches, a coupling connecting the rods, and made up of two shouldered members having telescoping threaded portions, one of said members being formed with flattened outer sides while the other member is provided with a milled head for turning it, a lever engaging the flattened sides of the said shouldered member, and means connecting it with the connected pistons, the separation or drawing together of the coupling members being accomplished by merely turning the milled head, the lever engaging the flattened sides of the outer member preventing the turning thereof.

In testimony whereof I affix my signature in presence of two witnesses.

JUAN DE DIOS TEJADA.

Witnesses:
JOHN L. FLETCHER,
CASSELL SEVERANCE.